United States Patent [19]

Laurent et al.

[11] Patent Number: 4,556,564

[45] Date of Patent: Dec. 3, 1985

[54] FEEDING OF ZEOLITE A TO POULTRY

[75] Inventors: Sebastian M. Laurent, Greenwell Springs; Robert N. Sanders, Baton Rouge, both of La.

[73] Assignee: Ethyl Corporation, Richmond, Va.

[21] Appl. No.: 475,370

[22] Filed: Mar. 14, 1983

[51] Int. Cl.$^4$ .............................................. A23K 1/24
[52] U.S. Cl. ........................................ 426/2; 426/72; 426/74
[58] Field of Search ...................... 426/2, 72, 74, 807; 423/328, 329; 424/154; 208/2

[56] References Cited

U.S. PATENT DOCUMENTS 3,836,676  9/1974  Komakine ........................ 252/184

OTHER PUBLICATIONS

Vest et al., *The Influence of Feeding Zeolites to Poultry Under Field Conditions,* Extension Poultry Science Department, University of Georgia, Georgia, "Abstract".
Nakaue, *Studies with Clinoptilolite in Poultry,* Poultry Science, 1981, 60:944–949.

*Primary Examiner*—Raymond Jones
*Assistant Examiner*—Elizabeth A. King
*Attorney, Agent, or Firm*—Donald L. Johnson; John F. Sieberth; Paul H. Leonard

[57] ABSTRACT

A method of improving the quality of egg shells of laying poultry or laying hens without deleterious effects on the contents of the poultry egg shells by adding a small amount of zeolite A to the feed of the poultry.

12 Claims, No Drawings

FEEDING OF ZEOLITE A TO POULTRY

BACKGROUND OF THE INVENTION

The present invention is in the general field of poultry farming and relates particularly to the feeding of laying fowl or layers.

The demand for poultry eggs, especially chicken eggs has expanded considerably over the last decade. The poultry industry has grown from a home industry to a large scale manufacturing industry in which tens of thousand of eggs are produced daily at single farms or egg laying installations. Some eggs are produced for eating and some eggs are produced for hatching. One problem with such large scale egg producing is breakage. Even a slight crack in an egg makes it unsuitable for hatching and most other marketing purposes. It is estimated that some six percent of all eggs produced are lost for marketing because of cracking or breakage. Shell strength is very important to inhibit breakage. The stronger the egg shell, the less likely the egg will be cracked or broken. Machinery and techniques necessary for carefully handling the eggs to avoid breakage are expensive and time consuming.

It is therefore an important object of the present invention to provide a means for increasing the strength of the shell of a poultry egg without increasing production costs and without having any deleterious effect on the food value or quality of the egg itself.

Another substantial loss of egg production estimated to be about a seven percent loss is the production of shell-less eggs. Any reduction in shell-less eggs can be an important factor in large scale egg production.

An article by C. Y. Chung et al from Nongsa Sihom Youngu Pogo 1978, 20 (Livestock) pp. 77-83 discusses the effects of cation exchange capacity and particle size of zeolites on the growth, feed efficiency and feed materials utilizability of broilers or broiling size chickens. Supplementing the feed of the broilers with naturally occurring zeolites, such as clinoptilolite, some increase in body weight gain was determined. Chung et al also reported tha earlier results at the Livestock Experiment Station (1974, 1975, 1976—Suweon, Korea) showed that no significant difference was observed when 1.5, 3, and 4.5 percent zeolite was added to chicken layer diets.

U.S. Pat. No. 3,836,676 issued to Chukei Komakine in 1974 discloses the use of zeolites as an adsorbent for adhesion moisture of ferrous sulfate crystals in an odorless chicken feed comprising such crystals and chicken droppings. The results were said to be no less than those in the case where chickens were raised with ordinary feed.

Experiments have been in progress in Japan since 1965 on the use of natural zeolite minerals as dietary supplements for poultry, swine and cattle. Significant increases in body weight per unit of feed consumed and in the general health of the animals was reported (Minato, Hideo, Koatsugasu 5:536, 1968). Reductions in malodor were also noted.

Using clinoptilolite and mordenite from northern Japan, Onagi, T. (Rept. Yamagata Stock Raising Inst. 7, 1966) found that Leghorn chickens required less food and water and gained as much weight in a two-week trial as birds receiving a control diet. No adverse effects on health or mortality were noted. The foregoing Japanese experiments were reported by F. A. Mumpton and P. H. Fishman in the *Journal of Animal Science*, Vol. 45, No. 5 (1977) pp. 1188–1203.

Canadian Pat. No. 939,186 issued to White et al in 1974 discloses the use of zeolites having exchangeable cations as a feed component in the feeding of urea or biuret non-protein (NPR) compounds to ruminants, such as cattle, sheep and goats. Natural and synthetic as well as crystalline and non-crystalline zeolites are disclosed. Zeolites tested included natural zeolites, chabazite and clinoptilolite and synthetic zeolites X, Y, F, J, M, Z, and A. Zeolite F was by far the most outstanding and zeolite A was substantially ineffective.

In a recent study at the University of Georgia, both broilers and layers were fed small amounts (about 2%) of clinoptilolite, a naturally occurring zeolite from Tilden, Tex. The egg shells from the hens receiving zeolite were slightly more flexible as measured by deformation, slightly less strong as measured by Instron breaking strength, and had a slightly lower specific gravity. The differences in egg shell quality were very small. This type of zeolite was ineffective in producing a stronger egg shell. An article written by Larry West and John Shutze entitled "The Influence of Feeding Zeolites to Poultry Under Field Conditions" summarizing the studies was presented at Zeo-Agriculture '82.

A study by H. S. Nakaue of feeding White Leghorn layers clinoptilolite, reported in 1981 Poultry Science 60:944–949, disclosed no significant differences in egg shell strength between hens receiving the zeolite and hens not receiving the zeolite.

Zeolites are crystalline, hydrated aluminosilicates of alkali and alkaline earth cations, having infinite, three-dimensional structures.

Zeolites consist basically of a three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example, a sodium ion. This balance may be expressed by the formula $Al/Na=1$. The spaces between the tetrahedra are occupied by water molecules prior to dehydration.

Zeolite A may be distinguished from other zeolites and silicates on the basis of their composition and X-ray powder diffraction patterns and certain physical characteristics. The X-ray patterns for these zeolites are described below. The composition and density are among the characteristics which have been found to be important in identifying these zeolites.

The basic formula for all crystalline sodium zeolites may be represented as follows:

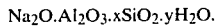

$$Na_2O.Al_2O_3.xSiO_2.yH_2O.$$

In general, a particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative number of these atoms do not significantly alter the crystal structure or physical properties of the zeolite. For zeolite A, the "x" value normally falls within the range 1.85±0.5.

The value for "y" is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for "y" for zeolite A is 5.1. The formula for zeolite A may be written as follows:

1.0±0.2Na$_2$O.Al$_2$O$_3$.1.85±0.5SiO$_2$.yH$_2$O.

In the formula, "y" may be any value up to 6.

An ideal zeolite A has the following formula:

(NaAlSiO$_4$)$_{12}$.27H$_2$O

Among the ways of identifying zeolites and distinguishing them from other zeolites and other crystalline substances, the X-ray powder diffraction pattern has been found to be a useful tool. In obtaining the X-ray powder diffraction patterns, standard techniques are employed. The radiation is the Kα doublet of copper and a Geiger counter spectrometer with a strip chart pen recorder is used. The peak heights, I, and the positions as a function of 2θ where θ is the Bragg angle, are read from a spectrometer chart. From these, the relative intensities, 100 I/I$_o$, where I$_o$ is the intensity of the strongest line or peak and d the interplanar spacing in angstroms corresponding to the recorded lines are calculated.

X-ray powder diffraction data for a sodium zeolite A are given in Table I.

TABLE I

X-RAY DIFFRACTION PATTERN FOR ZEOLITE A

| h$^2$ + k$^2$ + l$^2$ | d(Å) | 100 I / I$_o$ |
|---|---|---|
| 1 | 12.29 | 100 |
| 2 | 8.71 | 70 |
| 3 | 7.11 | 35 |
| 4 | 6.15 | 2 |
| 5 | 5.51 | 25 |
| 6 | 5.03 | 2 |
| 8 | 4.36 | 6 |
| 9 | 4.107 | 35 |
| 10 | 3.895 | 2 |
| 11 | 3.714 | 50 |
| 13 | 3.417 | 16 |
| 14 | 3.293 | 45 |
| 16 | 3.078 | 2 |
| 17 | 2.987 | 55 |
| 18 | 2.904 | 10 |
| 20 | 2.754 | 12 |
| 21 | 2.688 | 4 |
| 22 | 2.626 | 20 |
| 24 | 2.515 | 6 |
| 25 | 2.464 | 4 |
| 26 | 2.414 | >1 |
| 27 | 2.371 | 3 |
| 29 | 2.289 | 1 |
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 41 | 1.924 | 7 |
| 42 | 1.901 | 4 |
| 44 | 2.858 | 2 |
| 45 | 1.837 | 3 |
| 49 | 1.759 | 2 |
| 50 | 1.743 | 13 |
| 53 | 1.692 | 6 |
| 54 | 1.676 | 2 |
| 55 | 1.661 | 2 |
| 57 | 1.632 | 4 |
| 59 | 1.604 | 6 |

The more significant d values for zeolite A are given in Table II.

TABLE II

MOST SIGNIFICANT d VALUES FOR ZEOLITE A
d Value of Reflection in Å

12.2 ± 0.2
8.7 ± 0.2
7.10 ± 0.15
5.50 ± 0.10
4.10 ± 0.10
3.70 ± 0.07
3.40 ± 0.06
3.29 ± 0.05
2.98 ± 0.05
2.62 ± 0.05

Occasionally, additional lines not belonging to the pattern for the zeolite appear in a pattern along with the X-ray lines characteristic of that zeolite. This is an indication that one or more additional crystalline materials are mixed with the zeolite in the sample being tested. Small changes in line positions may also occur under these conditions. Such changes in no way hinder the identification of the X-ray patterns as belonging to the zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite, are not to exclude those materials which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simpler test described in "American Mineralogist," Vol. 28, page 545, 1943, permits a quick check of the silicon to aluminum ratio of the zeolite. According to the description of the test, zeolite minerals with a three-dimensional network that contains aluminum and silicon atoms in an atomic ratio of Al/Si=⅔=0.67, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

U.S. Pat. No. 2,882,243 describes a process for making zeolite A comprising preparing a sodium-aluminum-silicate water mixture having an SiO$_2$:Al$_2$O$_3$ mole ratio of from 0.5:1 to 1.5:1, and Na$_2$O/SiO$_2$ mole ratio of from 0.8:1 to 3:1, and an H$_2$O/Na$_2$O mole ratio of from 35:1 to 200:1, maintaining the mixture at a temperature of from 20° C. to 175° C. until zeolite A is formed, and separating the zeolite A from the mother liquor.

It is an important object of the present invention to provide an improved feed formulation for laying poultry or layers which contains a small amount of zeolite A.

It is a principal object of the invention to provide a poultry feed containing zeolite A which improves the quality of the shell of a poultry egg without causing a deleterious effect on the egg itself.

Another object of the invention is to provide an improved process for increasing the strength of egg shells from laying poultry wherein an effective amount of zeolite A is added to the diet of the poultry.

Still another object of the invention is to cost effectively increase poultry egg production.

Yet a further object of the present invention is to decrease the production of shell-less eggs by laying poultry.

Other objects and advantages of the invention will be more fully understood from a reading of the description and claims hereinafter.

SUMMARY OF THE INVENTION

The present invention relates to a method of improving the quality, i.e., the strength of egg shells of layers or laying poultry without deleterious effects on the contents of the egg itself wherein a small amount of zeolite A is added to the feed of the layers, and to a poultry feed composition containing zeolite A.

DESCRIPTION OF THE PREFERRED EMBODIMENT

It has been discovered that the addition of a relatively small amount of zeolite A to a regular or standard feed for laying chickens or hens effectively improves the quality of the egg shell with no significant changes in egg production, egg weight or feed consumption. Zeolite A is preferably added in amounts of from about 0.25 percent to about 4.00 percent of weight of the total feed.

A typical feed preparation for large scale laying hen operations comprises the following by weight percent:

|  |  |
|---|---|
| Corn | 62-68 |
| Soy Bean Meal | 18-24 |
| Limestone | 5-9 |
| Alfalfa Meal | 1 |
| Phosphates | 2 |
| Sand | 1-2 |
| Vitamins, Amino Acids Salt and Other Minerals | 0-1 |

Zeolite A is added to such feed formulation in small amounts by weight percent of up to about four. Greater amounts may be used, but may deprive the layers of the desired amount of nutrients. Greater amounts are also likely to be cost ineffective. A preferred amount of zeolite A is from about one-half to about two percent by weight of the total feed formulation. A most preferred amount of zeolite A is about 0.75 to about 1.50 weight percent of the total feed formulation.

The most convenient means of measuring egg shell strength is by measuring the specific gravity of the egg. This is simply done by immersing the egg in solutions of salt water of varying strengths. It is well known in the art that specific gravity correlates with egg shell strength. As specific gravity of the egg is raised, the strength of the egg shell is increased.

Using Ethyl EZA ® zeolite, a commercially available sodium zeolite A, a number of tests were conducted to determine the effect of zeolite on egg shell quality.

EXAMPLE I

Procedure: 480 hens (Dekalb XL pullets) were divided into eight equal groups and fed one of the following dietary treatments for a minimum of six weeks:

| Diet | Calcium (wt. %) | Zeolite A (Wt. %) |
|---|---|---|
| 1 | 4.00 | 0 |
| 2 | 4.00 | 0.75 |
| 3 | 4.00 | 1.50 |
| 4 | 4.00 | 0.68* |
| 5 | 2.75 | 0 |
| 6 | 2.75 | 0.75 |
| 7 | 2.75 | 1.50 |
| 8 | 2.75 | 0.75** |

*diet not adjusted for calcium
**zeolite added on top except diet not adjusted for Cl The diet fed to the hens consisted principally of corn supplemented with a soybean meal (SBM) and limestone. Smaller amounts of alfalfa meal, dicalcium phosphate (DiCalP), a synthetic amino acid (DL-methionine), salt, a commercial vitamin and mineral supplement for layers (Micro-Mix). Sand and/or hydrochloric acid (HCl) were added to some diets. Each diet assured that the hens received all of the required nutrients and minerals.

Diets 1-4 contained 1,238 calories per pound, 16% protein, 0.55% total sulfur amino acids, 4% calcium and 0.70% total phosphorous.

Diets 5-8 contained 1,292 calories per pound, 16% protein, 0.55% total sulfur amino acids, 2.75% calcium and 0.70% phosphorous.

All diets were isocaloric and isonitrogenous within treatments and are detailed in Table A.

TABLE A

Experimental Diets for Zeolite Study (Weight Percent)

| Ingredient | Diet No. | | | | | | | |
|---|---|---|---|---|---|---|---|---|
|  | 1 | 2 | 3 | 4 | 5 | 6 | 7 | 8 |
|  | 4.00% calcium | | | | 2.75% calcium | | | |
|  | 0.0 | 0.75 | 1.50 | .68 (special) | 0.0 | 0.75 | 1.50 | 0.75 |
| Corn | 63.80 | 63.80 | 63.80 | 63.80 | 67.83 | 67.83 | 67.83 | 67.83 |
| SBM | 21.41 | 21.41 | 21.41 | 21.41 | 20.69 | 20.69 | 20.69 | 20.69 |
| Alfalfa meal | 1.00 | 1.00 | 1.00 | 1.00 | 1.00 | 1.00 | 1.00 | 1.00 |
| Dicalcium Phosphate | 2.07 | 2.07 | 2.07 | 2.07 | 2.03 | 2.03 | 2.03 | 2.03 |
| Limestone | 9.14 | 9.14 | 9.14 | 9.14 | 5.87 | 5.87 | 5.87 | 5.87 |
| DL-methionine | 0.01 | 0.01 | 0.01 | 0.01 | — | — | — | — |
| Salt | 0.35 | 0.10 | — | 0.35 | 0.35 | 0.10 | — | 0.10 |
| Micro-mix | 0.50 | 0.50 | 0.50 | 0.50 | 0.50 | 0.50 | 0.50 | 0.50 |
| Sand | 1.72 | 0.82 | — | 1.04 | 1.72 | 0.82 | — | 1.23 |
| Zeolite A | — | 0.75** | 1.50** | 0.68* | — | 0.75** | 1.50** | 0.75** |
| HCl | — | 0.40 | 0.57 | 0.00 | — | 0.40 | 0.57 | — |

TABLE A-continued

Experimental Diets for Zeolite Study (Weight Percent)

| | Diet No. | | | | | | | |
|---|---|---|---|---|---|---|---|---|
| | 1 | 2 | 3 | 4 | 5 | 6 | 7 | 8 |
| | | 4.00% calcium | | | | 2.75% calcium | | |
| Ingredient | 0.0 | 0.75 | 1.50 | .68 (special) | 0.0 | 0.75 | 1.50 | 0.75 |
| | 100.0 | 100.0 | 100.0 | 100.0 | 100.0 | 100.0 | 100.0 | 100.0 |

*0.68 is the special zeolite. (Diet 4)
**0.75 and 1.50 is zeolite A.

Tests criteria were as follows:
1. Egg production (weekly)
2. Feed consumption (weekly)
3. Egg specific gravity (weekly)
4. Egg weight (weekly)
5. Shell weight (middle and end of experiment)
6. Serum calcium at termination
7. Body weight at initiation and termination
8. Mortality All eggs laid during a 3-day period each week of the experiment and the first week prior to the experiment were used for specific gravity and egg weight measurements.

The results are summarized in Tables B, C, D, E, F and G as follows:

TABLE D

SHELL WEIGHT (Grams/Egg)

| Diet | No. of Eggs | Week 4 | Week 8 | Avg. for 8 Weeks |
|---|---|---|---|---|
| 1-4 | 240 | 5.32 | 5.23 | 5.28 |
| 5-8 | 240 | 5.12 | 5.08 | 5.10 |
| 1 and 5 | 120 | 5.06 | 5.06 | 5.06 |
| 2 and 6 | 120 | 5.22 | 5.14 | 5.18 |
| 3 and 7 | 120 | 5.31 | 5.23 | 5.27 |
| 4 and 8 | 120 | 5.29 | 5.19 | 5.24 |
| 1 | 60 | 5.23 | 5.20 | 5.22 |
| 2 | 60 | 5.37 | 5.27 | 5.32 |
| 3 | 60 | 5.40 | 5.29 | 5.35 |
| 4 | 60 | 5.29 | 5.18 | 5.24 |
| 5 | 60 | 4.89 | 4.93 | 4.91 |
| 6 | 60 | 5.08 | 5.00 | 5.04 |
| 7 | 60 | 5.21 | 5.17 | 5.19 |
| 8 | 60 | 5.29 | 5.21 | 5.25 |

TABLE B

EGG SPECIFIC GRAVITY*

| Diet | No. of Eggs | Week 0 | Week 1 | Week 2 | Week 3 | Week 4 | Week 5 | Week 6 | Week 7 | Week 8 | Avg. for 8 Weeks |
|---|---|---|---|---|---|---|---|---|---|---|---|
| 1-4 | 240 | 80.24 | 80.33 | 80.70 | 81.03 | 80.90 | 80.52 | 78.21 | 80.76 | 80.69 | 80.39 |
| 5-8 | 240 | 80.04 | 78.69 | 78.32 | 79.15 | 78.57 | 77.75 | 76.48 | 78.99 | 78.80 | 78.34 |
| 1 and 5 | 120 | 79.88 | 78.37 | 77.63 | 78.16 | 77.96 | 77.14 | 75.42 | 77.90 | 77.74 | 77.54 |
| 2 and 6 | 120 | 79.64 | 79.13 | 79.47 | 79.93 | 79.83 | 79.43 | 77.20 | 80.10 | 79.51 | 79.33 |
| 3 and 7 | 120 | 80.56 | 80.60 | 81.14 | 81.59 | 80.84 | 79.87 | 78.85 | 80.67 | 81.15 | 80.59 |
| 4 and 8 | 120 | 80.47 | 79.93 | 79.79 | 80.67 | 80.33 | 80.08 | 77.91 | 80.83 | 80.58 | 80.01 |
| 1 | 60 | 80.27 | 80.12 | 79.42 | 80.30 | 79.86 | 79.49 | 77.59 | 79.53 | 79.19 | 79.44 |
| 2 | 60 | 79.70 | 79.03 | 80.53 | 81.17 | 81.27 | 80.67 | 78.86 | 81.01 | 81.29 | 80.48 |
| 3 | 60 | 80.35 | 81.84 | 81.96 | 81.92 | 81.66 | 81.53 | 79.16 | 81.33 | 81.91 | 81.44 |
| 4 | 60 | 80.64 | 80.33 | 80.88 | 80.73 | 80.82 | 80.38 | 77.22 | 81.18 | 80.38 | 80.24 |
| 5 | 60 | 79.50 | 76.63 | 75.83 | 76.03 | 76.06 | 74.80 | 73.25 | 76.28 | 76.30 | 75.65 |
| 6 | 60 | 79.60 | 79.24 | 78.41 | 78.70 | 78.39 | 78.20 | 75.55 | 79.19 | 77.73 | 78.17 |
| 7 | 60 | 80.77 | 79.35 | 80.32 | 81.26 | 80.01 | 78.21 | 78.54 | 80.01 | 80.40 | 79.76 |
| 8 | 60 | 80.31 | 79.54 | 78.70 | 80.61 | 79.83 | 79.79 | 78.60 | 80.47 | 80.77 | 79.79 |

*Divide by 1000 and add 1 to convert to Actual Specific Gravity.

TABLE C

EGG PRODUCTION (Percent Hen Per Day)

| Diet | No. of Percent Calculations | Week 0 | Week 1 | Week 2 | Week 3 | Week 4 | Week 5 | Week 6 | Week 7 | Week 8 | Avg. for 8 Weeks |
|---|---|---|---|---|---|---|---|---|---|---|---|
| 1-4 | 240 | 89.88 | 86.44 | 88.59 | 85.10 | 87.97 | 87.87 | 87.54 | 86.53 | 84.46 | 86.81 |
| 5-8 | 240 | 90.21 | 86.59 | 84.17 | 81.99 | 84.65 | 83.45 | 82.84 | 82.58 | 81.82 | 83.51 |
| 1 and 5 | 120 | 90.42 | 89.25 | 88.50 | 85.82 | 87.86 | 87.74 | 85.48 | 84.82 | 85.25 | 86.84 |
| 2 and 6 | 120 | 90.08 | 84.55 | 86.43 | 84.96 | 87.13 | 86.46 | 86.69 | 84.67 | 82.71 | 85.45 |
| 3 and 7 | 120 | 89.58 | 85.12 | 85.46 | 81.98 | 86.32 | 83.93 | 85.02 | 85.65 | 84.22 | 84.71 |
| 4 and 8 | 120 | 90.08 | 87.14 | 85.12 | 81.42 | 83.93 | 84.52 | 83.57 | 83.09 | 80.36 | 83.65 |
| 1 | 60 | 90.00 | 90.00 | 90.07 | 86.19 | 90.00 | 88.33 | 86.67 | 84.76 | 87.38 | 87.93 |
| 2 | 60 | 90.00 | 83.62 | 85.95 | 85.39 | 87.84 | 88.86 | 89.10 | 88.15 | 82.09 | 86.38 |
| 3 | 60 | 89.67 | 84.76 | 88.81 | 84.52 | 86.90 | 87.38 | 86.77 | 88.46 | 85.27 | 86.61 |
| 4 | 60 | 89.83 | 87.38 | 89.52 | 84.28 | 87.14 | 86.90 | 87.62 | 84.76 | 83.10 | 86.34 |
| 5 | 60 | 90.83 | 88.49 | 86.91 | 85.45 | 85.71 | 87.14 | 84.29 | 84.87 | 83.12 | 85.75 |
| 6 | 60 | 90.17 | 85.48 | 86.91 | 84.52 | 86.43 | 84.04 | 84.29 | 81.19 | 83.33 | 84.52 |
| 7 | 60 | 89.50 | 85.48 | 82.12 | 79.44 | 85.74 | 80.48 | 83.28 | 82.83 | 83.17 | 82.82 |
| 8 | 60 | 90.33 | 86.91 | 80.72 | 78.57 | 80.72 | 82.14 | 79.52 | 81.43 | 77.62 | 80.95 |

TABLE E

FEED CONSUMPTION (Grams Per Hen Per Day)

| Diet | No. of Weighings | Week 1 | Week 2 | Week 3 | Week 4 | Week 5 | Week 6 | Week 7 | Week 8 | Avg. for 8 Weeks |
|---|---|---|---|---|---|---|---|---|---|---|
| 1-4 | 240 | 105.48 | 108.16 | 109.76 | 110.13 | 112.85 | 105.64 | 110.57 | 115.53 | 109.76 |
| 5-8 | 240 | 103.91 | 101.62 | 106.01 | 96.66 | 107.96 | 103.42 | 107.12 | 112.09 | 104.85 |
| 1 and 5 | 120 | 112.06 | 105.92 | 109.32 | 107.44 | 112.54 | 106.08 | 110.57 | 116.80 | 110.09 |
| 2 and 6 | 120 | 101.85 | 104.96 | 107.04 | 105.92 | 109.13 | 102.66 | 108.82 | 113.69 | 106.76 |
| 3 and 7 | 120 | 102.08 | 105.07 | 107.99 | 101.47 | 110.17 | 105.25 | 109.16 | 112.40 | 106.70 |
| 4 and 8 | 120 | 102.78 | 103.60 | 107.20 | 98.76 | 109.76 | 104.12 | 106.84 | 112.35 | 105.67 |
| 1 | 60 | 113.25 | 109.55 | 112.98 | 115.07 | 117.42 | 106.76 | 113.94 | 119.90 | 113.61 |
| 2 | 60 | 99.45 | 106.05 | 107.28 | 110.78 | 111.20 | 102.75 | 109.22 | 113.21 | 107.49 |
| 3 | 60 | 104.65 | 109.60 | 111.13 | 108.85 | 111.98 | 107.66 | 110.73 | 115.78 | 110.05 |
| 4 | 60 | 104.56 | 107.43 | 107.65 | 105.82 | 110.78 | 105.38 | 108.40 | 113.21 | 107.90 |
| 5 | 60 | 110.86 | 102.30 | 105.65 | 99.81 | 107.65 | 105.41 | 107.21 | 113.69 | 106.57 |
| 6 | 60 | 104.24 | 103.88 | 106.80 | 101.05 | 107.07 | 102.57 | 108.42 | 114.16 | 106.02 |
| 7 | 60 | 99.52 | 100.53 | 104.85 | 94.08 | 108.37 | 102.83 | 107.59 | 109.03 | 103.35 |
| 8 | 60 | 101.01 | 99.77 | 106.75 | 91.70 | 108.74 | 102.87 | 105.28 | 111.48 | 103.45 |

TABLE F

BODY WEIGHT (Grams per Hen)

| Diet | No. of Weighings | Week 0 | Week 1 |
|---|---|---|---|
| 1-4 | 240 | 1,538.58 | 1,550.63 |
| 5-8 | 240 | 1,518.58 | 1,520.00 |
| 1 and 5 | 120 | 1,526.25 | 1,565.00 |
| 2 and 6 | 120 | 1,528.00 | 1,542.00 |
| 3 and 7 | 120 | 1,515.58 | 1,492.00 |
| 4 and 8 | 120 | 1,544.50 | 1,542.25 |
| 1 | 60 | 1,541.67 | 1,579.33 |
| 2 | 60 | 1,525.83 | 1,543.17 |
| 3 | 60 | 1,518.67 | 1,507.00 |
| 4 | 60 | 1,508.17 | 1,573.00 |
| 5 | 60 | 1,510.83 | 1,550.67 |
| 6 | 60 | 1,530.17 | 1,540.83 |
| 7 | 60 | 1,512.50 | 1,477.00 |
| 8 | 60 | 1,520.83 | 1,511.50 |

TABLE G

EGG WEIGHTS (Grams per Egg)

| Diet | No. of Weighings | Week 0 | Week 1 | Week 2 | Week 3 | Week 4 | Week 5 | Week 6 | Week 7 | Week 8 | Avg. for 8 Weeks |
|---|---|---|---|---|---|---|---|---|---|---|---|
| 1-4 | 240 | 59.04 | 59.87 | 59.98 | 60.06 | 60.33 | 59.95 | 59.88 | 60.19 | 60.19 | 60.05 |
| 5-8 | 240 | 58.85 | 59.38 | 59.45 | 59.59 | 59.84 | 59.81 | 59.51 | 59.60 | 59.97 | 59.64 |
| 1 and 5 | 120 | 58.58 | 59.12 | 59.49 | 59.53 | 59.64 | 59.77 | 59.59 | 60.14 | 60.22 | 59.69 |
| 2 and 6 | 120 | 58.93 | 59.96 | 59.91 | 59.84 | 60.13 | 59.88 | 59.64 | 59.97 | 60.09 | 59.93 |
| 3 and 7 | 120 | 58.95 | 59.72 | 59.80 | 59.86 | 60.26 | 59.77 | 59.81 | 59.72 | 60.01 | 59.87 |
| 4 and 8 | 120 | 59.31 | 59.69 | 59.67 | 60.06 | 60.31 | 60.08 | 59.73 | 59.76 | 59.99 | 59.91 |
| 1 | 60 | 58.74 | 59.66 | 60.03 | 60.03 | 60.03 | 59.81 | 60.13 | 60.70 | 60.77 | 60.18 |
| 2 | 60 | 59.21 | 60.28 | 59.98 | 60.05 | 60.37 | 60.56 | 59.93 | 60.39 | 60.23 | 60.22 |
| 3 | 60 | 58.94 | 59.62 | 60.26 | 60.00 | 60.57 | 59.56 | 59.92 | 59.88 | 60.13 | 59.99 |
| 4 | 60 | 59.26 | 59.92 | 59.66 | 60.17 | 60.05 | 59.85 | 59.54 | 59.78 | 59.61 | 59.82 |
| 5 | 60 | 58.42 | 58.59 | 58.95 | 59.03 | 58.95 | 59.73 | 59.04 | 59.58 | 59.66 | 59.19 |
| 6 | 60 | 58.66 | 59.64 | 59.84 | 59.64 | 59.90 | 59.20 | 59.34 | 59.54 | 59.96 | 59.63 |
| 7 | 60 | 58.96 | 59.83 | 59.34 | 59.72 | 59.95 | 59.97 | 59.71 | 59.56 | 59.89 | 59.75 |
| 8 | 60 | 59.35 | 59.46 | 59.70 | 59.96 | 60.56 | 60.32 | 59.93 | 59.75 | 60.36 | 60.01 | statistical data. As shown in Table E 1.5% zeolite A reduced feed consumption, relative to baseline, at both Ca levels in Weeks 1 and 4. However this did not occur in the other six weeks of the trial. Thus if we look at the results for the 8th week:

| % Ca | Run No. | Feed Cons. (g/hen/day) |
|---|---|---|
| 2.75 | 1 | 113.69 |
| 2.75 | 2 | 114.16 |
| 2.75 | 3 | 109.03 |
| 2.75 | 4 | 111.48 |

The reduced value is most likely attributable to a palatability consideration. Laying hens usually eat more than they need. Any factor, such as feed dustiness, can reduce intake by up to 5% without an adverse effect.

Tables F and G show no significant benefits for body

A review of the test data in Table B shows that zeolite A provided a definite benefit on shell quality, and had no significant effect on the other qualities studied except possibly for shell weight. Two concentrations (0.75%, 1.5%) were evaluated because of sodium limitations and for those levels, the data showed a linear relationship with concentration.

In Table C zeolite A had no significant effect on production (% hen day). However there is some indication that a slight reduction occurred, particularly with Diet 8 in the 2.75% Ca series (i.e. low-Ca).

In Table D there appears to be an indication of some benefits from zeolite A.

Previous indications that feed consumption was reduced without any reduction in egg or body weight or in egg production could not be substantiated by the and egg weights.

EXAMPLE II

Procedure: 480 hens were divided into eight equal groups and fed one of the following dietary treatments for a minimum of three months.

| Diet | TSAA (Wt. %) | Zeolite A (Wt. %) |
|---|---|---|
| 9 | 0.51 | 0 |
| 10 | 0.51 | 0.75 |
| 11 | 0.51 | 1.50 |
| 12 | 0.51 | 0.68* |
| 13 | 0.61 | 0 |
| 14 | 0.61 | 0.75 |

| Diet | TSAA (Wt. %) | Zeolite A (Wt. %) |
|---|---|---|
| 15 | 0.61 | 1.50 |
| 16 | 0.61 | 0.68* |

Diets 9–12 contained 1237 calories per pound, 17% protein, 0.61% TSAA (Total Sulphur Amino Acids), 3.75% calcium and 0.70% phosphorus.

Diets 13–16 contained 1262 calories per pound, 14.78% protein, 0.51% TSAA, 3.75% calcium and 0.70% phosphorus.

TABLE H

Experiment Diets for Zeolite Study (Weight Percent)

| Ingredient Name | 9 | 10 | 11 | 12 | 13 | 14 | 15 | 16 |
|---|---|---|---|---|---|---|---|---|
| | | 0.51% TSAA | | | | 0.61% TSAA | | |
| | 0.00% | 0.75% | 1.50% | 0.68 (special) | 0.00% | 0.75% | 1.50% | 0.68 (special) |
| Corn | 67.65 | 67.65 | 67.65 | 67.65 | 62.07 | 62.07 | 62.07 | 62.07 |
| SBM (48%) | 18.19 | 18.19 | 18.19 | 18.19 | 23.81 | 23.81 | 23.81 | 23.81 |
| Alfalfa (17%) | 1.00 | 1.00 | 1.00 | 1.00 | 1.00 | 1.00 | 1.00 | 1.00 |
| Dicalcium Phosphate (18.5%) | 2.12 | 2.12 | 2.12 | 2.12 | 2.01 | 2.01 | 2.01 | 2.01 |
| Limestone | 8.47 | 8.47 | 8.47 | 8.29 | 8.50 | 8.50 | 8.50 | 8.31 |
| DL-methionine | — | — | — | — | 0.04 | 0.04 | 0.04 | 0.04 |
| Salt | 0.35 | 0.10 | — | 0.35 | 0.35 | 0.10 | — | 0.35 |
| Micro-mix | 0.50 | 0.50 | 0.50 | 0.50 | 0.50 | 0.50 | 0.50 | 0.50 |
| Sand | 1.72 | 0.82 | — | 1.22 | 1.72 | 0.82 | — | 1.23 |
| Zeolite | — | 0.75 | 1.50 | 0.68 | — | 0.75 | 1.50 | 0.68 |
| HCl | — | 0.40 | 0.57 | — | — | 0.40 | 0.57 | — |
| TOTAL | 100.0 | 100.0 | 100.0 | 100.0 | 100.0 | 100.0 | 100.0 | 100.0 |

*special zeolite - 10.43% Ca and 0.52% Na.

The results of the tests are summarized in Tables P, J, K, L, M, and N.

TABLE P

EGG SPECIFIC GRAVITY*

| Diet | No. of Eggs | Week 0 | Week 1 | Week 2 | Week 3 | Week 4 | Week 6 | Week 7 | Week 8 | Avg. for 8 Weeks |
|---|---|---|---|---|---|---|---|---|---|---|
| 9–12 | 240 | 89.24 | 90.54 | 88.87 | 88.53 | 90.05 | 87.80 | 88.47 | 87.18 | 88.34 |
| 13–16 | 240 | 89.86 | 91.24 | 88.84 | 89.30 | 90.19 | 88.38 | 88.06 | 87.87 | 89.22 |
| 9 and 13 | 120 | 89.34 | 89.93 | 87.90 | 87.94 | 88.88 | 86.81 | 87.67 | 86.66 | 88.14 |
| 10 and 14 | 120 | 89.38 | 90.85 | 89.01 | 88.60 | 89.93 | 88.25 | 88.43 | 87.03 | 88.94 |
| 11 and 15 | 120 | 89.44 | 92.07 | 90.13 | 90.01 | 91.29 | 89.40 | 88.88 | 88.57 | 90.10 |
| 12 and 16 | 120 | 89.06 | 90.71 | 88.40 | 89.11 | 90.40 | 87.89 | 88.06 | 87.84 | 88.93 |
| 9 | 60 | 89.27 | 89.25 | 87.83 | 87.46 | 88.36 | 86.14 | 88.09 | 86.49 | 87.86 |
| 10 | 60 | 89.16 | 90.89 | 89.76 | 87.78 | 90.48 | 88.08 | 88.68 | 86.40 | 88.90 |
| 11 | 60 | 90.04 | 91.73 | 89.92 | 90.00 | 91.23 | 89.27 | 89.07 | 88.07 | 88.92 |
| 12 | 60 | 88.50 | 90.31 | 87.99 | 88.89 | 90.16 | 87.71 | 88.04 | 87.78 | 88.67 |
| 13 | 60 | 89.41 | 90.61 | 87.97 | 88.43 | 89.39 | 87.48 | 87.24 | 86.83 | 88.42 |
| 14 | 60 | 89.60 | 90.81 | 88.27 | 89.41 | 89.39 | 88.41 | 88.21 | 87.66 | 88.97 |
| 15 | 60 | 90.83 | 92.41 | 90.33 | 90.02 | 91.35 | 89.53 | 88.69 | 89.07 | 90.28 |
| 16 | 60 | 89.62 | 92.12 | 88.80 | 89.33 | 90.64 | 88.08 | 88.09 | 87.91 | 89.20 |

*Divide by 1000 and add 1 to convert to Actual Specific Gravity.

All diets were isocaloric and isonitrogenous and are detailed in Table H.

Tests criteria were the same as in Example I.

The components of the diets were also similar as those of Example I.

TABLE J

EGG PRODUCTION (Percent Hen Per Day)

| Diet | No. of Percent Calculations | 1 | 2 | 3 | 4 | 5 | 6 | 7 | 8 | 9 | 10 | 11 | 12 | Avg. for 12 Weeks |
|---|---|---|---|---|---|---|---|---|---|---|---|---|---|---|
| 9–12 | 240 | 57.26 | 69.54 | 78.04 | 80.82 | 84.93 | 87.00 | 85.83 | 89.24 | 88.33 | 87.81 | 81.55 | 87.87 | 81.52 |
| 13–16 | 240 | 53.41 | 69.40 | 81.83 | 87.13 | 89.39 | 89.92 | 89.18 | 89.92 | 87.53 | 88.76 | 84.13 | 88.24 | 83.24 |
| 9 and 13 | 120 | 53.73 | 71.31 | 82.12 | 85.19 | 87.94 | 87.86 | 86.34 | 89.48 | 89.22 | 87.63 | 82.06 | 85.29 | 82.35 |
| 10 and 14 | 120 | 60.23 | 71.31 | 75.71 | 76.47 | 82.74 | 89.22 | 89.52 | 91.19 | 88.69 | 90.12 | 86.19 | 90.60 | 82.58 |
| 11 and 15 | 120 | 51.93 | 64.32 | 78.01 | 85.01 | 87.65 | 89.17 | 85.76 | 88.61 | 86.73 | 88.86 | 83.31 | 87.59 | 81.41 |
| 12 and 16 | 120 | 55.43 | 70.95 | 83.89 | 89.25 | 90.31 | 88.60 | 88.40 | 89.04 | 87.06 | 86.52 | 79.79 | 88.74 | 83.16 |
| 9 | 60 | 55.00 | 70.48 | 80.24 | 81.67 | 85.48 | 87.14 | 82.86 | 88.34 | 88.81 | 87.14 | 77.82 | 84.76 | 80.79 |
| 10 | 60 | 60.95 | 70.95 | 70.48 | 67.86 | 76.43 | 85.24 | 88.34 | 91.43 | 89.76 | 89.29 | 85.48 | 89.76 | 80.50 |
| 11 | 60 | 56.72 | 70.08 | 81.75 | 87.88 | 88.15 | 88.18 | 83.41 | 87.94 | 87.04 | 88.92 | 83.28 | 89.57 | 82.57 |
| 12 | 60 | 56.35 | 66.67 | 79.68 | 85.87 | 89.66 | 87.43 | 88.71 | 89.26 | 87.70 | 85.90 | 79.81 | 89.39 | 82.20 |
| 13 | 60 | 52.46 | 72.14 | 83.99 | 88.71 | 90.40 | 88.57 | 89.82 | 90.63 | 89.63 | 88.12 | 86.51 | 85.82 | 83.90 |
| 14 | 60 | 59.53 | 71.67 | 80.95 | 85.07 | 89.05 | 91.19 | 90.71 | 90.95 | 87.62 | 90.95 | 86.91 | 91.43 | 84.67 |
| 15 | 60 | 47.14 | 58.57 | 74.28 | 82.14 | 87.14 | 90.17 | 88.10 | 89.29 | 86.43 | 88.81 | 83.33 | 87.62 | 80.25 |
| 16 | 60 | 54.52 | 75.24 | 88.10 | 92.62 | 90.95 | 89.76 | 88.10 | 88.81 | 86.43 | 87.15 | 79.76 | 88.10 | 84.13 |

TABLE K

SHELL WEIGHT (Grams/Egg)

| Diet | No. of Eggs | Week 1 | Week 2 | Avg. for 2 Weeks |
|---|---|---|---|---|
| 9–12 | 240 | 5.58 | 5.54 | 5.56 |
| 13–16 | 240 | 5.67 | 5.63 | 5.65 |
| 9 and 13 | 120 | 5.52 | 5.60 | 5.56 |
| 10 and 14 | 120 | 5.59 | 5.55 | 5.57 |
| 11 and 15 | 120 | 5.68 | 5.60 | 5.64 |
| 12 and 16 | 120 | 5.70 | 5.59 | 5.65 |
| 9 | 60 | 5.45 | 5.54 | 5.49 |
| 10 | 60 | 5.60 | 5.54 | 5.57 |
| 11 | 60 | 5.63 | 5.53 | 5.58 |
| 12 | 60 | 5.64 | 5.54 | 5.59 |
| 13 | 60 | 5.60 | 5.65 | 5.62 |
| 14 | 60 | 5.59 | 5.56 | 5.57 |
| 15 | 60 | 5.73 | 5.64 | 5.70 |
| 16 | 60 | 5.76 | 5.64 | 5.70 |

TABLE L

FEED CONSUMPTION (Grams Per Hen Per Day)

| Diet | No. of Weighings | Week 1 | Week 2 | Week 3 | Week 4 | Week 5 | Week 6 | Week 7 | Week 8 | Week 9 | Week 10 | Week 11 | Week 12 | 12 Weeks |
|---|---|---|---|---|---|---|---|---|---|---|---|---|---|---|
| 9–12 | 240 | 48.46 | 99.99 | 109.73 | 119.50 | 122.02 | 124.81 | 121.58 | 120.55 | 119.90 | 116.19 | 127.07 | 126.87 | 113.06 |
| 13–16 | 240 | 46.83 | 99.44 | 108.18 | 115.65 | 117.85 | 120.77 | 118.26 | 118.37 | 118.88 | 115.16 | 123.32 | 127.25 | 110.89 |
| 9 and 13 | 120 | 50.38 | 102.66 | 111.29 | 119.56 | 122.97 | 122.55 | 121.86 | 120.09 | 119.88 | 114.09 | 126.58 | 127.97 | 113.41 |
| 10 and 14 | 120 | 51.39 | 97.54 | 106.64 | 115.63 | 121.17 | 123.85 | 120.33 | 120.67 | 120.22 | 117.38 | 127.20 | 128.18 | 112.52 |
| 11 and 15 | 120 | 40.78 | 95.91 | 106.74 | 116.19 | 116.49 | 115.64 | 115.23 | 115.71 | 112.91 | 112.91 | 123.17 | 123.68 | 108.55 |
| 12 and 16 | 120 | 48.02 | 102.77 | 111.14 | 118.91 | 119.03 | 124.61 | 121.86 | 121.83 | 121.32 | 117.33 | 125.82 | 128.41 | 113.42 |
| 9 | 60 | 55.36 | 107.40 | 116.61 | 123.85 | 126.99 | 124.25 | 126.59 | 124.45 | 121.78 | 115.12 | 127.93 | 129.53 | 116.66 |
| 10 | 60 | 50.04 | 94.97 | 102.57 | 115.92 | 121.49 | 126.62 | 122.74 | 123.44 | 122.81 | 118.76 | 130.94 | 129.54 | 113.32 |
| 11 | 60 | 41.59 | 96.84 | 109.08 | 117.39 | 116.79 | 120.14 | 225.01 | 113.21 | 115.28 | 111.69 | 123.85 | 121.46 | 108.58 |
| 12 | 60 | 46.84 | 100.76 | 110.66 | 120.83 | 122.83 | 128.23 | 121.34 | 121.08 | 119.75 | 119.21 | 125.55 | 126.94 | 113.67 |
| 13 | 60 | 45.40 | 97.91 | 105.97 | 115.27 | 118.95 | 120.85 | 117.12 | 115.74 | 117.97 | 115.06 | 125.23 | 126.42 | 110.16 |
| 14 | 60 | 52.74 | 100.10 | 110.72 | 115.33 | 121.04 | 121.08 | 117.92 | 117.90 | 117.63 | 115.99 | 123.47 | 126.82 | 111.73 |
| 15 | 60 | 40.00 | 94.98 | 104.39 | 115.00 | 116.20 | 120.14 | 115.63 | 117.25 | 116.14 | 114.14 | 122.50 | 125.90 | 108.52 |
| 16 | 60 | 49.20 | 104.78 | 111.62 | 116.99 | 115.22 | 121.00 | 122.39 | 122.58 | 122.90 | 115.46 | 126.08 | 129.88 | 113.17 |

TABLE M

BODY WEIGHT (Grams per Hen)

| Diet No. | No. of Weighings | Difference |
|---|---|---|
| 9–12 | 240 | 218.00 |
| 13–16 | 240 | 219.46 |
| 9 and 13 | 120 | 228.25 |
| 10 and 14 | 120 | 219.50 |
| 11 and 15 | 120 | 205.33 |
| 12 and 16 | 120 | 221.83 |
| 9 | 60 | 239.50 |
| 10 | 60 | 228.33 |
| 11 | 60 | 179.67 |
| 12 | 60 | 224.50 |
| 13 | 60 | 217.00 |
| 14 | 60 | 210.67 |
| 15 | 60 | 231.00 |
| 16 | 60 | 219.17 |

TABLE N

EGG WEIGHTS (Grams per Egg)

| Diet | No. of Weighings | 1 Week | 2 Weeks | 3 Weeks | 4 Weeks | 6 Weeks | 8 Weeks | 10 Weeks | 12 Weeks | Avg. for 12 Weeks |
|---|---|---|---|---|---|---|---|---|---|---|
| 9–12 | 240 | 51.42 | 51.86 | 53.42 | 54.07 | 55.48 | 56.49 | 57.57 | 58.72 | 58.88 |
| 13–16 | 240 | 52.57 | 53.90 | 55.04 | 55.94 | 57.21 | 57.88 | 58.79 | 59.82 | 56.39 |
| 9 and 13 | 120 | 52.05 | 53.10 | 54.82 | 55.18 | 56.38 | 57.19 | 58.35 | 59.30 | 55.80 |
| 10 and 14 | 120 | 52.24 | 52.38 | 53.18 | 54.36 | 56.24 | 57.29 | 58.37 | 59.29 | 55.42 |
| 11 and 15 | 120 | 51.28 | 52.31 | 54.13 | 55.04 | 56.18 | 56.87 | 57.53 | 59.00 | 55.29 |
| 12 and 16 | 120 | 52.43 | 53.73 | 54.78 | 55.45 | 56.59 | 57.39 | 58.48 | 59.48 | 56.03 |
| 9 | 60 | 51.30 | 52.08 | 54.25 | 54.49 | 55.39 | 56.71 | 57.71 | 59.08 | 55.11 |
| 10 | 60 | 51.72 | 51.05 | 52.06 | 53.10 | 55.54 | 57.00 | 58.01 | 59.20 | 54.79 |
| 11 | 60 | 51.31 | 51.81 | 53.95 | 54.35 | 55.38 | 56.09 | 56.65 | 58.38 | 54.74 |
| 12 | 60 | 51.36 | 52.50 | 53.51 | 54.36 | 55.62 | 56.18 | 57.91 | 58.21 | 54.96 |
| 13 | 60 | 52.79 | 54.11 | 55.49 | 55.87 | 57.37 | 57.68 | 58.99 | 59.53 | 56.48 |
| 14 | 60 | 52.76 | 53.71 | 54.30 | 55.62 | 56.93 | 57.58 | 58.74 | 59.37 | 56.13 |
| 15 | 60 | 51.25 | 52.82 | 54.32 | 55.74 | 56.98 | 57.64 | 58.41 | 59.62 | 55.85 |
| 16 | 60 | 53.51 | 54.96 | 56.05 | 56.53 | 57.566 | 58.60 | 59.04 | 60.75 | 57.12 |

A review of the test data in Tables P and J through N shows that substantially the same results were obtained as those in Tables B through H.

In a preliminary study of a relatively few laying hens with one percent zeolite in the diet it was indicated that the relative ranks of zeolites in improving shell strength were as follows:

| Rank | Shell Strength |
|---|---|
| 1 | Zeolite A |
| 2 | Synthetic Mordenites |
| 3 | Synthetic Zeolite X |
| 4 | Natural Erionite |
| 5 | Natural Clinoptilolite |
| 6 | Synthetic Zeolite Y |

In shell strength, the controls were inferior to or equal to the poorest of all the zeolites.

The later studies clearly show that zeolite A is effective in increasing shell strength. Some increase in shell strength using mordenite should also be expected.

The term poultry includes all domestic fowl, namely chickens, turkeys, ducks, geese, and the like.

Corn is the principal diet for most laying poultry. A feed formulation comprising by weight percent the following is desirable:

|  | Weight Percent |
| --- | --- |
| corn | 50–75 |
| soybean meal | 10–30 |
| calcium carbonate | 4–10 |
| zeolite A | 0.25–4.0 |

Calcium carbonate is usually in the form of natural limestone ground to a suitable particle size, but sometimes oyster shells which have also been suitably ground are used.

It can be appreciated that a wide variety of nutrients or foods may be included in the diets of layers or poultry laying hens. In a controlled environment, the hens are only exposed to desired foods or food products. A typical laying ration composition contains the following:

|  |  | Weight Percent |
| --- | --- | --- |
| crude protein | not less than | 16.0 |
| crude fat | not less than | 2.5 |
| crude fiber | not more than | 7.0 |
| calcium (as Ca) | not less than | 3.1 |
| calcium (as Ca) | not more than | 4.1 |
| phosphorus (P) | not less than | 0.5 |
| iodine (I) | not less than | 0.0001 |
| salt (NaCl) | not less than | 0.3 |
| salt (NaCl) | not more than | 0.9 |

The foregoing composition is obtained from or included the following ingredients:

Grain and processed grain by-products. Includes corn, corn hominy, corn germ meal, barley, millet, oats, rice, rice hulls, rye, sorghum, wheat and wheat shorts. These are among the energy ingredients, mostly carbohydrates with some proteins.

Plant protein products. Includes soybean oil meal, barley malt sprouts, coconut meal, corn distillers grain, corn gluten meal, cottonseed meal, pea seed, potato meal, peanut meal, rape seed meal, sunflower meal, wheat germ meal, brewers' yeast. All of these are protein sources.

Roughage or fiber. Includes dehydrated alfalfa, alfalfa hay, alfalfa leaf meal and pasture grasses. These are all fiber sources.

Animal and fish by-products. Includes blood meal, blood flour, dried buttermilk, dried whey, dried casein, fish meal, dried fish solubles, liver meal, meat meal, meat meal tankage, bone meal and dried skim milk. Anchovies, herring and menhaden are sources of fish meal.

Minerals and synthetic trace ingredients. Includes vitamins such as B-12, A, pantothenate, niacin, riboflavin, K, etc., DL methionine, choline chloride, folic acid, dicalcium phosphate, magnesium sulfonate, potassium sulfate, calcium carbonate (limestone, oyster shells), salt, sodium selenite, manganous oxide, calcium iodate, copper oxide, zinc oxide and D activated animal sterol.

Molasses and animal fats are added to improve palatability and to increase or balance the energy levels.

Preservatives are also added such as, Ethoxyquin TM and sodium sulfite.

In general, a feed composition for poultry laying hens should preferably contain by weight percent the following:

|  |  | Weight Percent |
| --- | --- | --- |
| crude protein | at least about | 14 |
| crude fat | at least about | 2 |
| crude fiber | not more than about | 7 |
| calcium | about | 2.7 to 4.1 |
| phosphorous | at least about | 0.05 |
| iodine | at least | 0.0001 |
| sodium | about | 0.1 to 0.4 |
| chlorine | about | 0.1 to 0.5 |
| zeolite A | about | 0.25 to 4.0 |

The foregoing disclosure and description of the invention is illustrative and explanatory thereof and various changes in the illustrated process may be made within the scope of the appended claims without departing from the spirit of the invention.

What is claimed is:

1. A method of increasing the quality of the egg shell of a poultry laying hen wherein an effective amount of zeolite A sufficient to improve the quality of the egg shell up to about 4 weight percent of the feed is added to the feed of the hen and the feed is fed to the hen.

2. The method of claim 1, wherein the amount of zeolite A added to the feed is from about 0.25 percent to three percent by weight.

3. The method of claim 1, wherein the amount of zeolite A added to the feed is about 0.75 weight percent.

4. The method of claim 1, wherein the amount of zeolite A added to the feed is about 1.5 weight percent.

5. A method of increasing the quality of the egg shell of the eggs of laying poultry wherein a feed formulation comprising principally corn, and about 0.25 to about 4.00 percent by weight of zeolite A is fed to the laying poultry.

6. The method of claim 5, wherein the feed formulation contains zeolite A in an amount of about 0.75 to about 1.5 weight percent.

7. A method of increasing the quality of the egg shell of laying poultry, wherein a feed formulation comprising by weight percent, 50–75 percent corn, 10–30 percent soybean meal and 4–10 percent calcium carbonate, and about 0.25 percent to about 4.0 percent by weight of zeolite A is fed to the laying poultry.

8. The method of claim 7, wherein the feed formulation contains zeolite A in an amount of about 0.75 to about 1.5 weight percent.

9. A method of increasing the quality of the egg shell of poultry laying hens, wherein said hens are fed a feed composition comprising proteins, carbohydrates, minerals and vitamins and about 0.25 percent to about 4.0 percent by weight of zeolite A.

10. The method of claim 9, wherein said zeolite A in said feed composition is in an amount of about 0.75 to about 1.5 weight percent.

11. A method of increasing the quality of the egg shell of the eggs of poultry laying hens wherein a feed composition comprising by weight percent the following:

crude protein: at least 14
crude fat: at least 2
crude fiber: not more than 7.0
calcium: about 2.7 to 4.1
phosphorus: at least 0.4
iodine: at least 0.0001
sodium: about 0.1 to 0.4 chloride: about 0.1 to 0.5
zeolite A: about 0.25 to 4.0 is fed to the poultry laying hens.

12. A method of increasing the quality of the egg shell of the eggs of poultry laying hens wherein a feed composition comprising by weight percent the following:
crude protein: at least 16
crude fat: at least 2.5
crude fiber: mot more than 7.0
calcium: about 3.1 to 4.1
phosphorus: at least 0.5
iodine: at least 0.0001
sodium: about 0.1 to 0.3
chloride: about 0.1 to 0.3
zeolite A: about 0.25 to 4.0 is fed to the poultry laying hens.

* * * * *

UNITED STATES PATENT AND TRADEMARK OFFICE
CERTIFICATE OF CORRECTION

PATENT NO. : 4,556,564
DATED : December 3, 1985
INVENTOR(S) : Sebastian M. Laurent et al It is certified that error appears in the above-identified patent and that said Letters Patent is hereby corrected as shown below:

Column 1, line 44, "tha" should read -- that --;

Column 8, Table D, after
  "7        60        5.21        5.17        5.19"
next line should read
-- 8        60        5.29        5.21        5.25 --;

Column 8, between Tables B and C, line reading
  "8        60        5.29        5.21        5.25" should be blank;

Columns 9-10, Table G, Diet 1, Week 4, "60.03" should read
  -- 60.33 --;

Columns 13-14, Table L, last column heading, "12 Weeks" should read -- Avg. for --;
                    12 Weeks Column 18, line 1, "mot" should read -- not --.

Signed and Sealed this

Fifteenth Day of April 1986

[SEAL]

Attest:

DONALD J. QUIGG

Attesting Officer    Commissioner of Patents and Trademarks